United States Patent [19]

Zamorani et al.

[11] Patent Number: 5,238,611
[45] Date of Patent: Aug. 24, 1993

[54] PROCESS FOR PRODUCING GRANULATED PARTICLES FROM A POWDER

[75] Inventors: Edmondo Zamorani, Varese; Giovanni Brambilla, Villanova di Castenaso, both of Italy

[73] Assignee: Euratom, Luxembourg

[21] Appl. No.: 690,896

[22] PCT Filed: Jan. 15, 1990

[86] PCT No.: PCT/EP90/00073
§ 371 Date: Jun. 17, 1991
§ 102(e) Date: Jun. 17, 1991

[87] PCT Pub. No.: WO90/07977
PCT Pub. Date: Jul. 26, 1990

[30] Foreign Application Priority Data
Jan. 18, 1989 [LU] Luxembourg .............. 87434

[51] Int. Cl.$^5$ .................. B29B 9/10
[52] U.S. Cl. .................. 264/13; 264/63; 264/0.5
[58] Field of Search .......... 264/0.5, 9, 13, 63, 264/125

[56] References Cited

U.S. PATENT DOCUMENTS

| | | | |
|---|---|---|---|
| 3,352,950 | 11/1967 | Helton et al. | 264/0.5 |
| 3,970,580 | 7/1976 | Zimmer | 264/13 |
| 4,060,497 | 11/1977 | Huschka et al. | 264/0.5 |
| 4,256,676 | 3/1981 | Kovach | 264/0.5 |
| 4,571,315 | 2/1986 | Gerontopoulos et al. | 264/0.5 |
| 4,866,023 | 9/1989 | Ritter et al. | 502/318 |

Primary Examiner—Mary Lynn Theisen
Attorney, Agent, or Firm—Sughrue, Mion, Zinn, Macpeak & Seas

[57] ABSTRACT

A process for producing granulated particles from a powder which is insoluble in water, employs dimensions of the formed granulated particles which are substantially larger than those of the powder grains. The powder is mixed with an aqueous solution of a cellulose chosen from among methyl cellulose, hydroxypropyl methyl cellulose, etheric hydroxybutyl methyl cellulose. Then droplets of this mixture are made to fall into an aqueous solution of at least one metallic salt or metallic hydroxide which does not react with the particles.

8 Claims, 1 Drawing Sheet

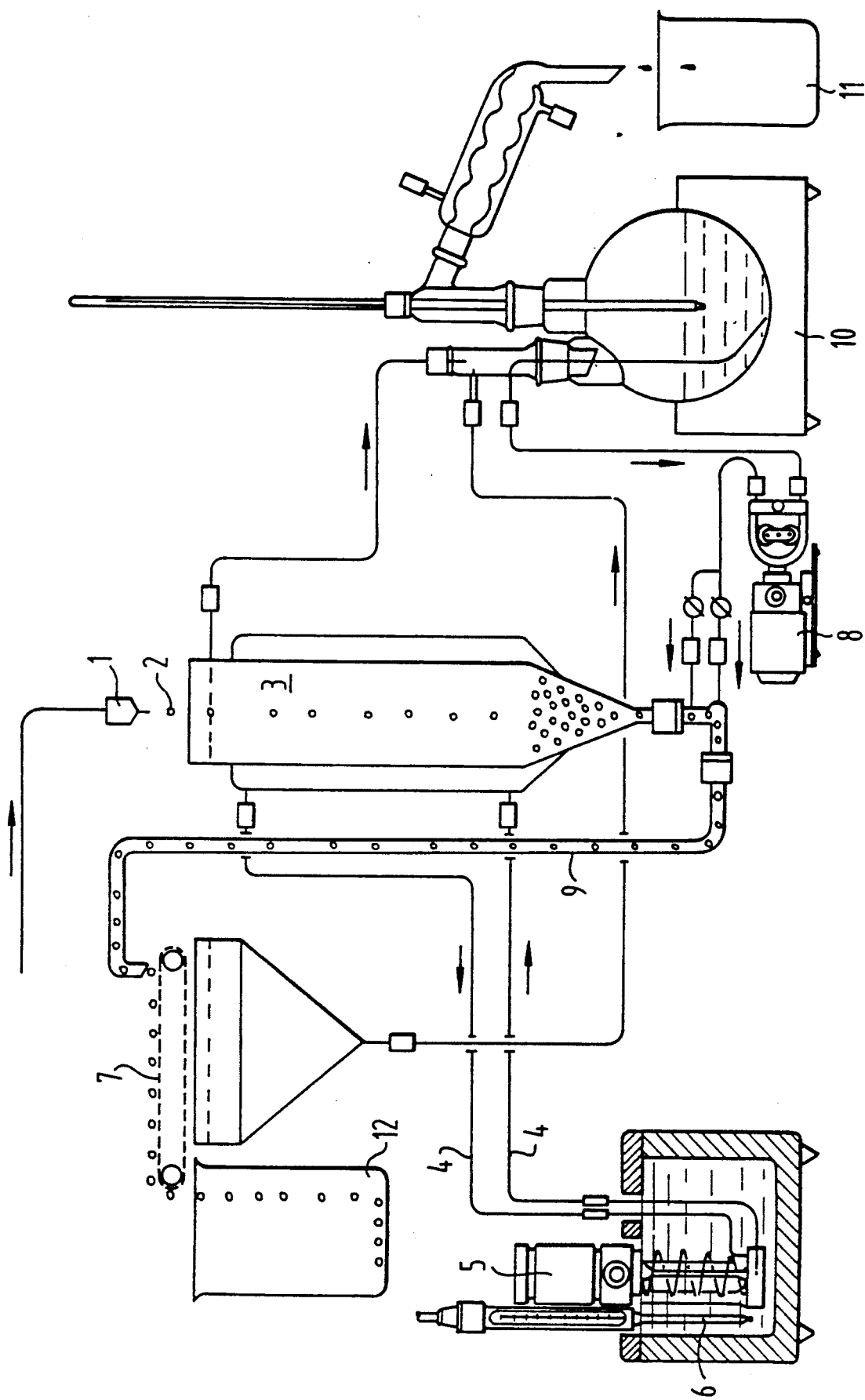

PROCESS FOR PRODUCING GRANULATED PARTICLES FROM A POWDER

FIELD OF THE INVENTION

The invention relates to a process for producing granulated particles from a powder which is insoluble in water, the dimensions of the formed granulated particles being substantially larger than those of the powder grains.

BACKGROUND OF THE INVENTION

Agglomeration is a fundamental process of the chemical industry.

A distinction is made in the art between a mechanical compactation, a thermal agglomeration such as for example sintering, and a chemical aggregation according to the methods described by Browning in Chem. Eng. 71(25), 1987, page 147 or by the document DE-37 16 286 A1.

The aim of these processes is often to obtain granulated particles which can be manipulated more easily than finely dispersed powders. In practice, this may concern fertilizers, which, in granulated form, are easier to distribute on the ground than powders, raw materials for the glass or ceramic manufacture, ashes from combustion or powders and muds collected by an air filter.

A particular application concerns the immobilization of radioactive or toxic and noxious waste in a cement matrix in spherical shape. Thus, these products can be transported pneumatically or wrapped and stored without a risk of proliferation.

The conventional methods for a mechanical compactation have the drawback that there remains always a small quantity of finely dispersed powder. Furthermore, and this applies to all known methods of thermal agglomeration and chemical aggregation, they do not supply particles of a given spherical diameter, but particles of varying shapes and dimensions. Finally, it is desirable to dispose of other methods in order to enlargen the variety of powders which can thus be processed.

The invention thus aims at presenting a process of producing granulated particles, the shape of which is similar to that of a sphere and the dimensions of which are hardly dispersed and can further be influenced by acting on certain parameters of the process. Moreover, the process according to the invention must be able to be utilized with a greater variety of basic powders than the known processes.

SUMMARY OF THE INVENTION

These objects are attained according to the invention by the fact that the powder is mixed with an aqueous solution of a cellulose chosen among methyl cellulose, hydroxypropyl methyl cellulose etheric hydroxybutyl methyl cellulose, and that then droplets of this mixture are made to fall into an aqueous solution of at least one salt or metallic hydroxide which does not react with said particles.

As to characteristics of certain preferred examples of operation of the process according to the invention, reference is made to the detailed description of the preferred embodiment which follows.

BRIEF DESCRIPTION OF THE DRAWING

The invention will now be described more in detail with reference to the unique FIGURE which shows a laboratory scale device for the application of said process.

DESCRIPTION OF THE PREFERRED EMBODIMENT

The process substantially comprises the following steps:

The powder to be agglomerated is mixed with an aqueous solution of a carbohydrate based compound chosen among methyl cellulose, hydroxypropyl methyl cellulose and hydroxybutyl methyl cellulose. The methyl cellulose has the following chemical structure:

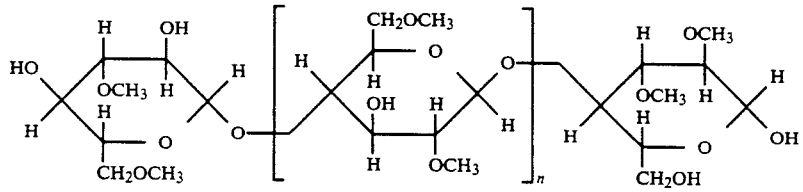

The quantity and the concentration of this compound in water are such that a stable, homogenous and sufficiently fluid suspension is obtained so that droplets can be formed. This concentration lies for example at 3,5%.

It has to be noted that the molecule of methyl cellulose is non-ionic (contrary to that of carboxy methyl cellulose used in the process according to DE-37 16 286 A1). Thus, it can not be precipitated in the form of an insoluble salt in polyvalent metallic ions.

This suspension is made to fall through holes or calibrated tubes of a diameter from some tenths of millimeter to some millimeters into an aqueous bath of at least one salt or metallic hydroxide not reacting with the particles in question. The concentration of this solution is such that the compound immediately precipitates in contact with the bath. The droplets thus formed solidify rapidly in the form of regular spheres of uniform dimensions. The dimensions of the spheres depend on the size of the holes or tubes through which the suspension falls into the bath.

In this context, reference is made to German patent 12 12 841, which concerns the manufacture of spheres of uranium and/or thorium oxide. In this document, an aqueous solution of uranium and/or thorium salts is firstly prepared; to this solution a compound on the basis of carbon hydrate is added and this solution is made to fall into an alkaline bath. However, due to the nature of the basic products, this process is not apt to agglomerate the grains of a powder.

In the enclosed unique figure, there can be seen a laboratory scale apparatus permitting to produce granulated particles from said powder mixed with an aqueous solution of a methyl cellulose compound. This mixture passes through an injection tube 1 and falls droplet by droplet 2 into a bath comprising a precipitating aqueous solution of NaOH, KOH, NaCO₃ or Na₂SO₄. This bath is thermostated by a heat conveying circuit 4 comprising a pump 5 and a thermocouple 6 for ensuring a temperature of the bath of about 80° C. The droplets 2 solidify when falling into the bath and can be retracted at the bottom of the bath immediately after their sedimentation. This extraction and the transfer of the granulates towards a drying grid 7 are ensured by a pump 8 which injects the precipitating solution into a conduit 9 permitting to convey the spheres. This same pump can also serve to recyle this solution in a solution concentration column 10 in order to conserve the concentration of the solution, the distilled water being collected in a recipient 11 at the outlet of the column 10.

After having traversed the drying grid, the granulated particles or spheres are collected in a recipient 12.

These particles may then by washed in water and dried in air at a temperature between 80° and 100° C.

If it is desired to destroy the cellulosic compound, the particles can be calcinated at a temperature between 450° and 500° C. By carrying out a thermal treatment at an even higher temperature, a sintering or the formation of a ceramic product is obtained, depending on the nature of the material of the basic powder.

Herebelow, some application examples of the process according to the invention are indicated.

EXAMPLE 1

25 g of $BaCO_3$ in powder form are dispersed by agitation in 25 ml of an aqueous solution 3,5% of METHOCEL 4AC of the society Dow Chemical. 50 ml water are successively added in order to obtain a certain fluidness of the dispersion. Then, this dispersion is made to fall through a hole with a diameter of 1 millimeter into a bath containing 250 ml of an aqueous solution of NaOH of a concentration of 20%. After agglomeration, the created spheres are immediately extracted from the bath, dried at 90° C. and then calcinated in an oven at 500° C. Thus, a material of regular form (diameter about 5 mm) and high mechanical resistance is obtained.

EXAMPLE 2

35 g of a powder of $Al(OH)_3$ are dispersed in 40 ml of an aqueous solution 3,5% of METHOCEL 4AC. 25 ml of water are added.

The dispersion thus obtained is made to fall trough a hole of 1 mm into a solution of NaOH of a concentration of 20%, and regular spheres of a diameter of 60 mm are obtained after a drying step at 90° C.

A similar result is obtained by using a bath of $Na_2CO_3$ in water (concentration 25%).

EXAMPLE 3

An ordinary cement powder is employed, which is dispersed in water and an aqueous solution 3,5% of METHOCEL 4AC. The composition of the obtained paste is the following:

| | |
|---|---|
| Cement = | 62% |
| Solution of METHOCEL = | 10,2% |
| Water = | 27,8% |

The dispersion is made to fall through a hole or a system of holes of about 1 mm in diameter into a solution of NaOH of a concentration of 20%. Spheres of a diameter of about 7 mm are obtained, which after a maturation at 60° C. and 98% relative humidity present a good mechanical resistance.

Other examples of application of the process according to the invention are shown in the following table.

| Powder materials | Dispersion (percentage in weight) | | | aqueous solution of the bath |
|---|---|---|---|---|
| | Material | METHOCEL 3,5% | Water | |
| wood ashes | 27,8 | 27,8 | 44,4 | NaOH 20% |
| $Fe_2O_3$ | 25,0 | 25,0 | 50,0 | NaOH 20% |
| Diatomite | 20,0 | 26,6 | 53,0 | $Na_2SO_4$ 20% |
| $CaCO_3$ | 24,4 | 36,6 | 39,0 | NaOH 20% |
| MgO | 46,8 | 31,3 | 21,9 | $Na_2CO_3$ 20% |
| Carbon | 35,5 | 30,0 | 34,5 | NaOH 20% |

The process according to the invention allows to manufacture monodispersed granulated particles of a very regular spherical shape of the desired dimension. The process is very economical, because the solution of the precipitation can be recycled through a simple concentration stage. The only chemical compound consumed during the process is cellulose resin. Furthermore, the process of the agglomeration itself takes place at ambient or hardly elevated temperature. Finally, this process can be applied to a great variety of powderous materials and even to muds. The obtained granulated particles can be treated, transported and stored without problems, which is in general not the case for the respective powder.

The process is not limited to the above-cited examples. It can, on the contrary, be applied to other powder materials such as fertilizers radioactive, toxic and noxious waste, filter muds.

If the mechanical resistance of the particles thus obtained is insufficient, this resistance can be improved by adding cement powder to the powder to be compacted.

We claim:

1. A process for producing granulated particles from a powder which is insoluble in water, the dimensions of the formed granulated particles being substantially larger than those of the powder grains, said process comprising the steps of mixing the powder with an aqueous solution of a cellulose chosen from the group consisting of methyl cellulose, hydroxypropyl methyl cellulose and etheric hydroxybutyl methyl cellulose, and causing droplets of the mixture to fall into an aqueous solution of at least one metallic salt or metallic hydroxide which does not react with said particles.

2. A process according to claim 1, further comprising the step of adding cement to said mixture prior to causing the droplets of said mixture to fall into said solution.

3. A process according to claim 1, wherein the solution is heated up to a temperature between 50° and 150° C.

4. A process according to claim 1, wherein the produced particles are washed and then calcinated at a temperature such that said cellulose decomposes.

5. A process according to claim 1, wherein the produced particles are sintered at a temperature exceeding 500° C.

6. A process according to claim 1, wherein the metallic hydroxide is chosen from the group consisting of NaOH and KOH.

7. A process according to claim 1 wherein the metallic salt is chosen from the group consisting of $Na_2CO_3$ and $Na_2SO_4$.

8. A process according to claim 3, wherein the solution is heated up to a temperature of 80 ° C.

* * * * *